Aug. 22, 1933. G. A. LYON 1,924,086
TIRE COVER WITH CONTRACTIBLE CLAMPING BANDS
Original Filed Oct. 27, 1928
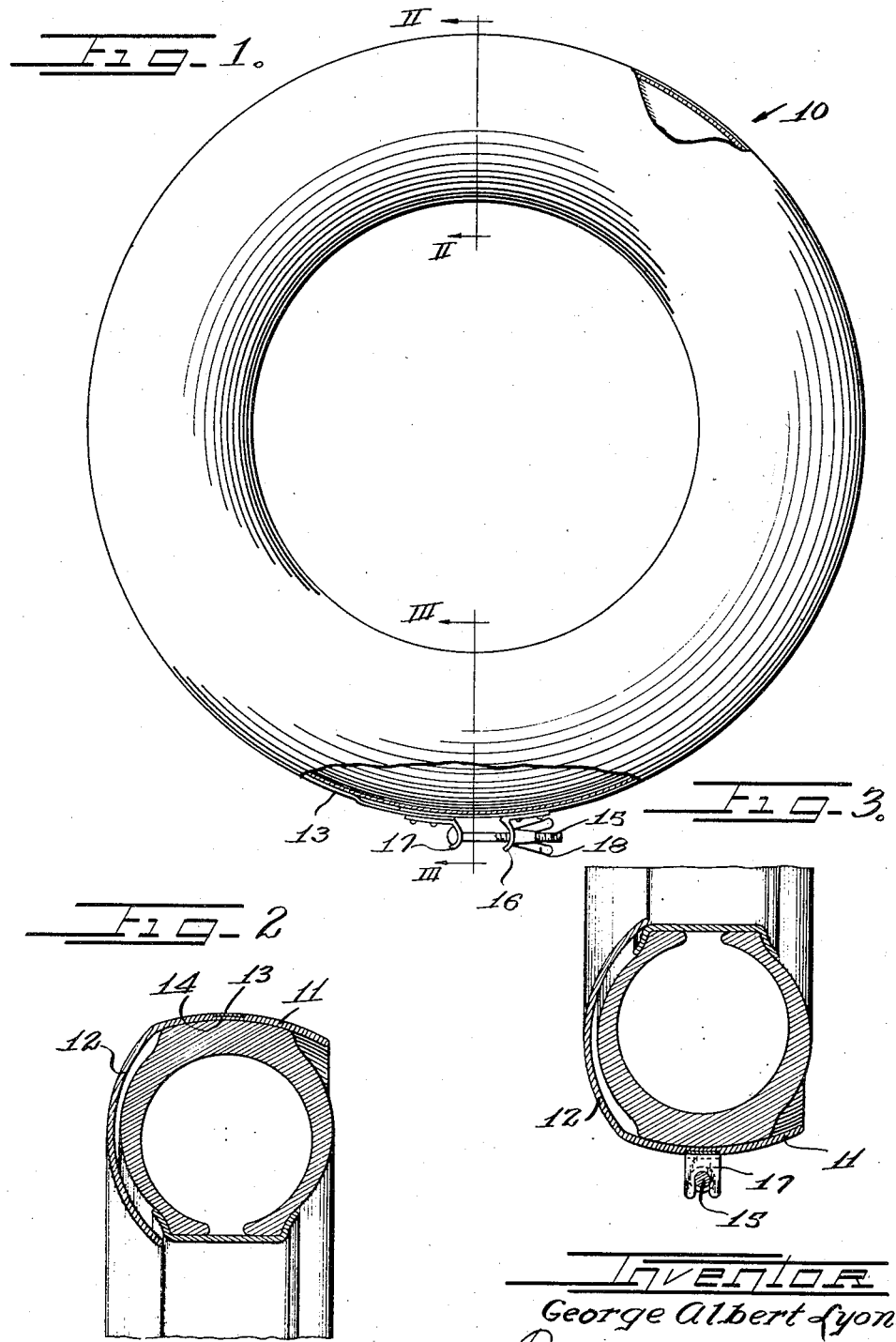

Patented Aug. 22, 1933

1,924,086

UNITED STATES PATENT OFFICE 1,924,086

TIRE COVER WITH CONTRACTIBLE CLAMPING BANDS

George Albert Lyon, Allenhurst, N. J., assignor to Lyon Incorporated, Asbury Park, N. J., a Corporation of Delaware Original application October 27, 1928, Serial No. 315,455. Divided and this application April 1, 1931. Serial No. 526,882

4 Claims. (Cl. 150—54).

This invention relates to tire covers and more particularly to a protective cover for a spare tire on an automotive vehicle.

The subject matter of the present invention has been divided from my copending patent application, Serial No. 315,455, filed October 27, 1928 now Patent No. 1,875,316, Sept. 6, 1932.

The object of this invention is to provide a tire cover with circumferential clamping means to secure the cover in proper tire protecting position on the spare tire to which it is applied.

In accordance with the general features of this invention there is provided an annular tire cover including a rim portion for covering the outer periphery of the tire and a side portion for covering the outer side wall of the spare tire and means for clamping this cover on the tire including a strip extending circumferentially around the rim part and adapted to secure the cover in proper tire protecting position on the spare tire to which it is applied.

Other objects and features of this invention will more fully appear from the following detailed description taken in connection with the accompanying drawing which illustrate several embodiments thereof, and in which Figure 1 is a front view of my novel improved tire cover partly broken away to show the construction of the same;

Figure 2 is a fragmentary cross sectional view taken substantially on the line II—II of Figure 1 looking in the direction indicated by the arrows; and Figure 3 is a fragmentary cross sectional view taken on substantially the line III—III of Figure 1 looking in the direction indicated by the arrows and illustrating the construction of the clamping means.

The tire cover illustrated in Figure 1 is designated generally by the reference character 10 and comprises a rim portion 11 adapted to cover the outer periphery of the tire and a side plate portion 12 for covering the outer side wall of the spare tire to which the cover is applied. These two parts 11 and 12 are so formed that the cover may be shoved axially onto the spare tire. This cover may be made of any suitable flexible material such for example as molded rubber. The material, however, should be of sufficient flexibility so that the rim 11 may be contracted upon the tire when the cover is being secured in place by a clamping means which I shall now describe in detail.

In order to enable the cover to be secured in place on the tire the cover is provided with a contractible band 13 surrounding the peripheral portion or rim 11 and embedded in a circumferential groove 14 formed in the rim 11. This band 13 is made in the form of a split rim the ends of which overlap in telescoping relation. The ends of the band are connected by a bolt 15 mounted in an opening in the bracket 16 attached at one end of the band, the head end of which bolt engages in a slot in a bracket 17 attached to the other end of the band. A wing nut 18 is threaded on the bolt and engages the bracket 16.

The structure above described is so formed that the band may be contracted by manipulation of the wing nut 18. Contracting of the band will force the peripheral or rim portion 11 of the cover firmly upon the tread portion of the tire, thereby securing the tire cover in proper protecting position on the tire.

Needless to say it is of course understood that my particular form of clamping means disclosed herein is not limited in its application to the specific form of cover illustrated since it may be used with equal advantage in applications to other forms of tire covers.

Now, I desire it understood that although I have illustrated and described in detail the preferred form of my invention, the invention is not to be thus limited but only so far as defined by the scope and spirit of the appended claims.

I claim as my invention:

1. A tire cover comprising in combination means for covering a side of a tire and the tread thereof and means including a split band for contracting that part of said covering means covering the tread of the tire to secure the tire cover upon the tire said contracting means being disposed on top of said tread covering means and being concentric therewith.

2. In a tire cover including a portion for covering the tread of the tire and a portion for covering a side wall of the tire, means for clamping the cover to the tire including a band extending about and over the outer surface of the portion of the cover adapted to be disposed over the tread of the tire and means connected to the ends of the band for drawing them toward each other to clamp said tread covering portion to the tire whereby the cover is secured in proper tire protecting position on the tire.

3. In a tire cover including a rim portion for covering the outer periphery of a tire, clamping means for securing the cover in proper tire protecting position on the tire, including a band disposed circumferentially about and over the outer surface of the said rim portion and provided with means for enabling the band to be tightened to secure said rim portion to the tire.

4. In a tire cover including a flexible rim portion for covering the outer periphery of a tire, clamping means associated with said rim portion comprising a band disposed in a circumferential depression in the rim portion and means connected to the ends of the band for drawing them toward each other to secure said rim portion to the periphery of the tire.

GEORGE ALBERT LYON.